United States Patent [19]
Stern

[11] 3,930,743
[45] Jan. 6, 1976

[54] FLUIDIC GOVERNOR SYSTEM
[75] Inventor: Hansjoerg Stern, Scotia, N.Y.
[73] Assignee: General Electric Company, New York, N.Y.
[22] Filed: Dec. 26, 1973
[21] Appl. No.: 428,098

[52] U.S. Cl. ........................ 415/36; 417/24; 417/47
[51] Int. Cl.² ................... F04B 49/00; F01D 17/06; F01B 25/06
[58] Field of Search ......... 137/826, 827, 42, 44, 46, 137/47; 415/1, 30, 36; 73/521; 417/24, 47

[56] References Cited
UNITED STATES PATENTS

| | | | |
|---|---|---|---|
| 1,566,995 | 12/1925 | Standerwick | 417/46 |
| 2,941,120 | 6/1960 | Harmon et al. | 417/42 |
| 3,424,370 | 1/1969 | Law | 415/1 |
| 3,499,599 | 3/1970 | Meininger et al. | 417/44 |
| 3,538,931 | 10/1970 | Blosser, Jr. | 137/806 |
| 3,580,086 | 5/1971 | Doherty | 73/521 |
| 3,743,434 | 7/1973 | Geary | 415/30 |

*Primary Examiner*—William L. Freeh
*Attorney, Agent, or Firm*—Walter C. Bernkopf; Robert A. Cahill; Frank L. Neuhauser

[57] ABSTRACT

A fluidic governor system for controlling the speed of a drive shaft output of a prime mover, comprising a fluidic governor, a reciprocating or vane compressor, a fluidic RC filter, and a valve. The compressor is mechanically coupled to and driven by the drive shaft output of the prime mover, and generates both pneumatic power and a pulsating fluidic signal which has a frequency proportional to the rotation of the drive shaft output of the prime mover. The fluidic RC filter blocks the passage of the pulsating fluidic signal and converts the power output to a steady pneumatic power supply which powers the fluidic governor, while the pulsating fluidic signal is acoustically sensed by the governor. A speed error signal whose magnitude is proportional to the error in the frequency of the pulsating fluidic signal, is generated from a control output port of the fluidic governor for regulating the energy supply to the prime mover by means of the valve to correct the speed of the drive shaft output of the prime mover.

8 Claims, 1 Drawing Figure

3,930,743

FLUIDIC GOVERNOR SYSTEM

BACKGROUND OF THE INVENTION

1. Field of the Invention

This invention relates to a fluidic governor system, and, more particularly, to a fluidic governor system which is capable of controlling the output of any prime mover where no separate fluidic energy is available to power the governor.

2. Description of the Prior Art

Fluidic governor systems have been used to control the output of prime movers, such as steam turbines, gas turbines and air motors. In all cases, pneumatic or hydraulic, power has to be available for this system to be operative. In a steam turbine, plant instrument air is both used to power the fluidic governor and a turbine mounted interrupter which produces a pulsating fluidic signal. In a gas turbine, the compressor discharge air is used to power the fluidic governor and to provide the power for the pulsating fluidic signal from the output shaft of the prime mover. In an air motor, its gaseous exhaust is used as the fluidic signal having a frequency proportional to the output of the air motor, wherein the fluidic signal is coupled to a control input port of a fluidic governor, and an external power source is needed to supply the power to a power input port of the fluidic governor. For the above prime movers, a speed error signal is generated from the control output port of the fluidic governor, and this speed error signal is used to stroke a valve to adjust the fuel, air or steam feed to the prime mover, and thereby control the shaft output speed of the prime mover.

The above prior art systems could only be used in limited applications and are not adaptable to any prime mover, unless pneumatic power is available to drive the governor and generate the pulsating fluidic signal.

OBJECTS OF THE INVENTION

It is therefore an object of this invention to provide a fluidic governor system which is capable of controlling the output of any prime mover.

It is another object of this invention to provide a fluidic governor system which does not rely upon an external source for supplying pneumatic power to the fluidic governor.

Other objects of the invention will be pointed out in and understood from the following.

SUMMARY OF THE INVENTION

In accordance with a broad aspect of the invention there is provided a fluidic governor system for controlling the speed of a drive shaft output of a prime mover, comprising a fluidic governor, a compressor, a fluidic RC filter and a valve. The compressor is mechanically coupled to and driven by the drive shaft output of the prime mover, and generates both pneumatic power and a pulsating fluidic signal which has a frequency proportional to the rotation of the drive shaft output of the prime mover. The fluidic RC filter blocks the pulsating fluidic signal and converts the power output to a steady pneumatic power supply which is applied to a power input port of the fluidic governor, while the pulsating fluidic signal is being acoustically sensed by the governor. A speed error signal, whose magnitude is proportional to the error in the frequency of the pulsating fluidic signal, is generated from a control output port of the fluidic governor for regulating the energy supply to the prime mover by means of the valve to correct the speed of the drive shaft output of the prime mover.

The fluidic RC filter is comprised of a fluidic resistor and a fluidic capacitor. One terminal of the fluidic resistor is fluidically coupled to the pneumatic power from the compressor, and the other terminal of the fluidic resistor is fluidically coupled to one terminal of the fluidic capacitor. The other terminal of the fluidic capacitor is fluidically coupled to the power input port of the fluidic governor.

The fluidic governor system can further contain a contamination filter and a pressure regulator interposed between the second terminal of the fluidic capacitor and the power input port of the fluidic governor. The filter insures that clean gas is supplied to the fluidic governor to prevent the contamination of the governor, and the regulator insures that the pneumatic power supply to the fluidic governor is at a relatively constant pressure.

BRIEF DESCRIPTION OF THE DRAWING

The drawing provides a block diagram illustration of the fluidic governor system in accordance with the invention.

DESCRIPTION OF THE PREFERRED EMBODIMENT

Figure 1:
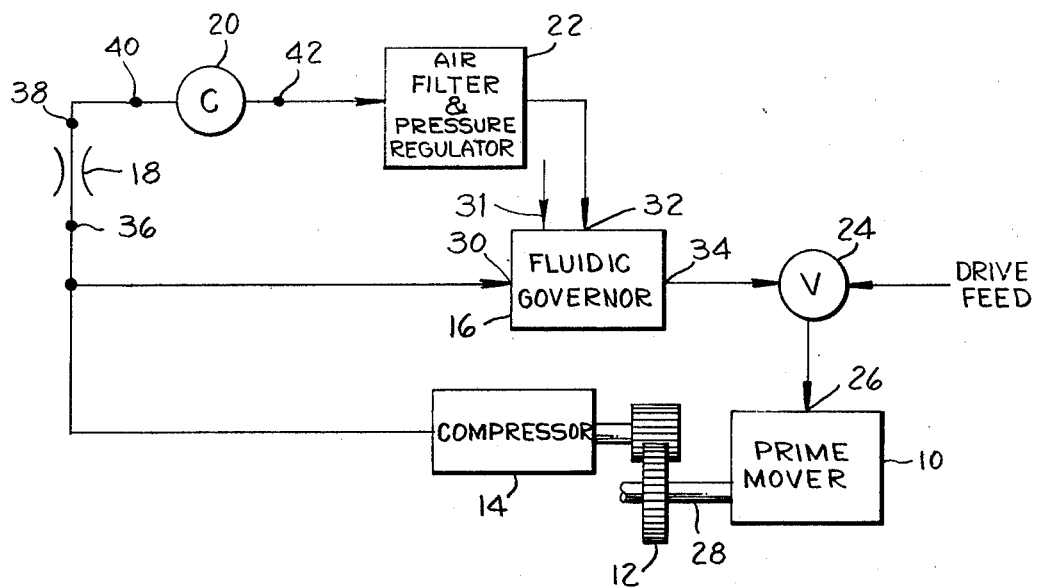

Referring to the drawing, the invention will now be described.

In accordance with the invention, the fluidic governor system is comprised of a prime mover 10, a gear train 12, a compressor 14, a fluidic governor 16, a fluidic resistor 18, a fluidic capacitor 20, an air filter and pressure regulator 22, and a valve 24. Prime mover 10 has a power input 26, for receiving the drive feed (energy supply) necessary to drive the prime mover, and an output drive shaft 28. The prime mover can be comprised of any standard air motor, steam or gas turbine, gasoline engine or any other similar equipment. Gear train 12 is used to mechanically couple output drive shaft 28 of prime mover 10 to the input of compressor 14. Compressor 14 can be comprised of a standard vane or piston pump, and, more particularly, a pneumatic vane blower having a standard tacho-generator drive pad and spline capable of mating with the prime mover tachometer gear drive. The compressor generates both pneumatic power and a pulsating fluidic signal. The pneumatic power serves as the source of power for the fluidic governor, and the pulsating fluidic signal provides a pulse train at a frequency which is proportional to the rotation of the drive shaft output of the prime mover.

Fluidic governor 16 has a control input port 30, a set point adjust 31, a power input port 32 and a control output port 34. The governor can be the same type as described in U.S. Pat. No. 3,580,086, inventor Martin C. Doherty, entitled "Fluidic Speed Governor", and assigned to the same assignee as the assignee of the present invention, or can be the same as Model CR280AG24 or CR280AG33 made by the Speciality Fluidics Operation of the General Electric Company, Schenectady, N.Y. The pulsating fluidic signal from the output of compressor 14 is fluidically coupled to control input port 30 of fluidic governor 16, wherein the governor acoustically senses the frequency of the pulsating fluidic signal. At this point it should be noted that the pneumatic power and the pulsating fluidic signal can be comprised of air or any other suitable gas.

Fluidic resistor 18 has one terminal 36 fluidically connected to the output of compressor 14, and its other terminal 38 fluidically connected to one terminal 40 of fluidic capacitor 20. The other terminal 42 of fluidic capacitor 20 is fluidically connected to the input of air filter and pressure regulator 22. Fluidic resistor 18 can be comprised of any suitable component, such as the "RF32 FIXED RESISTOR" supplied by the Specialty Fluidics Operation of the General Electric Company, while fluidic capacitor 20 can also be comprised of any suitable component, such as the "CF32 CAPACITOR" also supplied by the Specialty Fluidics Operation of the General Electric Company. Fluidic resistor 18 in combination with fluidic capacitor 20 provide a means for blocking the passage of the pulsating fluidic signal to the power input port of the governor and for converting the pneumatic power to a (smooth) steady fluidic power supply. In this instance, the combination of fluidic resistor 18 and fluidic capacitor 20 functions as a fluidic RC filter, wherein the series connection of the fluidic capacitor in the fluid line provides a characteristic similar to an electrical shunt capacitance for blocking the "AC" component of pneumatic flow from the compressor. It should also be noted that the fluidic filter formed by fluidic resistor 18 and fluidic capacitor 20 can be replaced by any standard restrictor and a pneumatic accumulator or volume.

As described in U.S. Pat. No. 3,580,086, the pulsating fluidic signal from the output of compressor 14 is imposed on input port 30 of governor 16, wherein a fluidic blocking capacitor or a first fluidic signal amplifier receives the pulsating fluidic signal. The fluidic governor acts to convert the frequency of the pulsating fluidic signal into a proportional fluidic signal and suitably amplifies its power level. The governor further compares the proportional fluidic signal with a speed set point provided by set point adjust 31, and generates a speed error signal from its output port 34 for driving valve 24.

Air filter and pressure regulator 22 is interposed between terminal 42 of fluidic capacitor 20 and power input port 32 of fluidic governor 16, or any other suitable location in the line leading to input port 32 of the governor, to insure that a clean pneumatic power source at a constant pressure is supplied to the governor. The air filter is, of course, a standard component, while the pressure regulator can be comprised of a diaphragm operated poppet valve. Such a filter-regulator combination is supplied by the Norgren Company.

Valve 24 receives the speed error signal generated from control output port 34 of fluidic governor 16, whereby the magnitude of the speed error signal is proportional to the error in the frequency of the pulsating fluidic signal from the compressor. The speed error signal adjusts a drive feed (energy supply) flowing through valve 24 to power input 26 of prime mover 10, and thereby corrects the rotational speed of output drive shaft 28 of the prime mover. If the prime mover is an air motor, the drive feed is comprised of a source of compressed air, while the valve is comprised of a needle valve which is stroked by the speed error signal. Alternatively, if the prime mover is comprised of a steam turbine, the valve can be comprised of a sleeve or globe or butterfly valve for controlling the steam supply. If the prime mover is a gasoline engine, the valve is comprised of either a butterfly valve or a throttle, while the drive feed is provided by gasoline. In a gas turbine prime mover, the valve will be the fuel valve controlling the fuel supply to a burner.

In operation, if there is an increase in speed of output drive shaft 28 of prime mover 10, the frequency of the pulsating fluidic signal from the compressor increases. This, in turn, causes an increase in the magnitude of the speed error signal from the control output port of the fluidic governor, which, in turn, causes valve 24 to be so adjusted that the drive feed to the prime mover decreases. The decrease in drive feed (energy supply) to the prime mover causes a corresponding decrease in the speed of output drive shaft 28. Similarly, if the speed of the output drive shaft 28 has decreased, the frequency of the pulsating fluidic signal from the compressor also decreases, thus causing a corresponding decrease in the magnitude of the speed error signal at the control output port of the fluidic governor. This, in turn, causes adjustment of valve 24 to allow a greater quantity of drive feed to pass therethrough and to the prime mover, which, in turn, causes the speed of output drive shaft 28 to increase.

Although the invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A fluidic governor system for controlling the speed of a drive shaft output of a prime mover, comprising:
    a. a fluidic governor having a control input port, a power input port and a control output port;
    b. a compressor, mechanically coupled to and driven by the drive shaft output of the prime mover, for generating both pneumatic power and a pulsating fluidic signal having a frequency proportional to the rotation of the drive shaft output of the prime mover, the pulsating fluidic signal being fluidically coupled to said control input port of said fluidic governor;
    c. means for blocking the passage of said pulsating fluidic signal to said power input port of said governor and for converting the pneumatic power to a steady fluidic power supply, the steady fluidic power supply being fluidically coupled to said power input port of said fluidic governor; and
    d. means for adjusting a drive feed supplied to a power input of the prime mover to correct the speed of the drive shaft output of said prime mover in response to a speed error signal which is generated from said control output port of said fluidic governor and whose magnitude is proportional to the error in the frequency of the pulsating fluidic signal from said compressor.

2. A fluidic governor system according to claim 1, wherein said converting means is comprised of a fluidic RC filter.

3. A fluidic governor system according to claim 2, wherein said fluidic RC filter is comprised of:
    a. a fluidic resistor having a first and a second terminal, said first terminal being fluidically coupled to the generated output from said compressor; and
    b. a fluidic capacitor having a first and a second terminal, said first terminal of said fluidic capacitor being fluidically connected to said second terminal of said fluidic resistor, and said second terminal of said fluidic capacitor being fluidically coupled to said power input port of said fluidic governor.

4. A fluidic governor system according to claim 3, further comprising a gas filter and a fluidic regulator interposed between said second terminal of said fluidic capacitor and said power input port of said fluidic governor.

5. A fluidic governor system comprising:
   a. a fluidic governor having a control input port, a power input port and a control output port;
   b. a prime mover having a power input and a drive shaft output;
   c. a compressor, mechanically coupled to and driven by said drive shaft output of said prime mover, for generating both pneumatic power and a pulsating fluidic signal having a frequency proportional to the rotation of said drive shaft output of said prime mover, the pulsating fluidic signal being fluidically coupled to said control input port of said fluidic governor;
   d. means for blocking the passage of said pulsating fluidic signal to said power input port of said governor and for converting the pneumatic power to a steady fluidic power supply, the steady fluidic power supply being fluidically coupled to said power input port of said fluidic governor; and
   e. means for adjusting a drive feed supplied to said power input of said prime mover to correct the speed of said drive shaft output of said prime mover in response to a speed error signal which is generated from said control output port of said fluidic governor and whose magnitude is proportional to the error in the frequency of the pulsating fluidic signal from said compressor.

6. A fluidic governor system according to claim 5, wherein said converting means is comprised of a fluidic RC filter.

7. A fluidic governor system according to claim 6, wherein said fluidic RC filter is comprised of:
   a. a fluidic resistor having a first and a second terminal, said first terminal being fluidically coupled to the generated output from said compressor; and
   b. a fluidic capacitor having a first and a second terminal, said first terminal of said fluidic capacitor being fluidically connected to said second terminal of said fluidic resistor, and said second terminal of said fluidic capacitor being fluidically coupled to said power input port of said fluidic governor.

8. A fluidic governor system according to claim 7, further comprising a gas filter and a fluidic regulator interposed between said second terminal of said fluidic capacitor and said power input port of said fluidic governor.

* * * * *